US012665267B2

(12) United States Patent
Chen et al.

(10) Patent No.: US 12,665,267 B2
(45) Date of Patent: Jun. 23, 2026

(54) BATTERY CELL, BATTERY AND POWER CONSUMING DEVICE

(71) Applicant: JIANGSU CONTEMPORARY AMPEREX TECHNOLOGY LIMITED, Liyang City (CN)

(72) Inventors: Xin Chen, Liyang City (CN); Xiaoming Ge, Liyang City (CN)

(73) Assignee: JIANGSU CONTEMPORARY AMPEREX TECHNOLOGY LIMITED, Liyang (CN)

( * ) Notice: Subject to any disclaimer, the term of this patent is extended or adjusted under 35 U.S.C. 154(b) by 725 days.

(21) Appl. No.: 18/085,503

(22) Filed: Dec. 20, 2022

(65) Prior Publication Data

US 2023/0123940 A1 Apr. 20, 2023

Related U.S. Application Data

(63) Continuation of application No. PCT/CN2021/136573, filed on Dec. 8, 2021.

(30) Foreign Application Priority Data

Mar. 24, 2021 (CN) .......................... 202110311658.4

(51) Int. Cl.
*H01M 50/533* (2021.01)
*H01M 10/052* (2010.01)
(Continued)

(52) U.S. Cl.
CPC ....... *H01M 50/533* (2021.01); *H01M 10/052* (2013.01); *H01M 10/0525* (2013.01);
(Continued)

(58) Field of Classification Search
None
See application file for complete search history.

(56) References Cited

U.S. PATENT DOCUMENTS 9,413,039 B2    8/2016   Kwak et al.
2010/0178536 A1    7/2010   Kwak et al.
(Continued)

FOREIGN PATENT DOCUMENTS

CN    101777663 A    7/2010
CN    207459058 U    6/2018
(Continued)

OTHER PUBLICATIONS

Machine English translation of CN-209658286-U originally published to Li Nov. 19, 2019 (Year: 2019).*
(Continued)

*Primary Examiner* — Mary Grace Harris
(74) *Attorney, Agent, or Firm* — K&L Gates LLP

(57) ABSTRACT

The present application relates to a battery cell, a battery and a power consuming device. The battery cell comprises an electrode assembly and a current collecting member. The electrode assembly comprises a main body portion and tabs extending from the main body portion. The current collecting members each comprises a guide section and a tab connecting section, the tab connecting section connected to a respective tab, the guide section located on the side of the main body portion from which the tab extends and connected to the tab connecting section, a fold is provided between the tab connecting section and the guide section and extends in a first direction, and the guide section comprises a first end and a second end opposite to each other in the first direction. The guide section is provided with a reinforcement portion extending from the first end to the second end.

15 Claims, 11 Drawing Sheets

(51) Int. Cl.

| | |
|---|---|
| *H01M 10/0525* | (2010.01) |
| *H01M 10/054* | (2010.01) |
| *H01M 50/178* | (2021.01) |
| *H01M 50/211* | (2021.01) |
| *H01M 50/536* | (2021.01) |
| *H01M 50/54* | (2021.01) |
| *H01M 50/553* | (2021.01) |
| *H01M 50/583* | (2021.01) |
| *H01M 50/588* | (2021.01) |

(52) U.S. Cl.
CPC ....... *H01M 10/054* (2013.01); *H01M 50/178* (2021.01); *H01M 50/211* (2021.01); *H01M 50/536* (2021.01); *H01M 50/54* (2021.01); *H01M 50/553* (2021.01); *H01M 50/583* (2021.01); *H01M 50/588* (2021.01); *H01M 2220/20* (2013.01); *H01M 2220/30* (2013.01); *Y02E 60/10* (2013.01)

(56) References Cited

U.S. PATENT DOCUMENTS

| | | | | |
|---|---|---|---|---|
| 2011/0177375 A1* | 7/2011 | Pfanner | ................. | H01M 10/14 |
| | | | | 429/146 |
| 2013/0095372 A1* | 4/2013 | Kim | ................. | H01M 10/0431 |
| | | | | 429/211 |
| 2015/0188101 A1* | 7/2015 | Zhang | ................. | H01M 50/296 |
| | | | | 429/99 |
| 2019/0067665 A1 | 2/2019 | Jang | | |
| 2020/0343559 A1 | 10/2020 | Li et al. | | |
| 2022/0115748 A1* | 4/2022 | Xu | ...................... | H01M 50/533 |

FOREIGN PATENT DOCUMENTS

| | | | | | | |
|---|---|---|---|---|---|---|
| CN | 208014792 U | * | 10/2018 | ............. | H01R 11/05 |
| CN | 208014793 U | | 10/2018 | | |
| CN | 208507745 U | | 2/2019 | | |
| CN | 209658286 U | * | 11/2019 | | |
| CN | 111048728 A | | 4/2020 | | |
| CN | 111864172 A | | 10/2020 | | |
| CN | 112701422 A | | 4/2021 | | |
| EP | 3451415 A1 | * | 3/2019 | ......... | H01M 50/538 |
| EP | 3731318 A1 | | 10/2020 | | |
| JP | 2012227113 A | | 11/2012 | | |
| JP | 2016009600 A | | 1/2016 | | |
| JP | 2019087341 A | | 6/2019 | | |

OTHER PUBLICATIONS

Machine English translation of CN-208014792-U originally published to Xing Oct. 26, 2018 (Year: 2018).*

The extended European search report received in the counterpart European Application 21931935.7, mailed on Jan. 3, 2025.

Beijing Weifei Lianchuang Intellectual Property Agency Co., Ltd., PCT/CN2021/136573, International Search Report and Written Opinion, Mar. 2, 2022, 16 pgs.

Beijing Weifei Lianchuang Intellectual Property Agency Co., Ltd., CN202110311658.4, First Office Action, Apr. 29, 2021, 10 pgs.

Notice of Reasons for Refusal received in the corresponding Japanese Application 2022-561580, mailed Nov. 20, 2023.

* cited by examiner

1000

100

BATTERY CELL, BATTERY AND POWER CONSUMING DEVICE

CROSS-REFERENCE TO RELATED APPLICATIONS

This application is a continuation application of PCT Patent Application No. PCT/CN2021/136573, entitled "BATTERY CELL, BATTERY AND POWER CONSUMING DEVICE" filed on Dec. 8, 2021, which claims priority to Chinese Patent Application No. 202110311658.4, filed with the State Intellectual Property Office of the People's Republic of China on Mar. 24, 2021, and entitled "BATTERY CELL, BATTERY AND POWER CONSUMING DEVICE", all of which are incorporated herein by reference in their entirety.

TECHNICAL FIELD

The present application relates to the technical field of batteries, and particularly to a battery cell, a battery and a power consuming device.

BACKGROUND ART

Energy conservation and emission reduction are the key to the sustainable development of the automobile industry. Electric vehicles have become an important part of the sustainable development of the automotive industry due to their advantages in energy conservation and environmental protection. For the electric vehicles, the battery technology is an important factor to their development.

In the development of battery technology, how to improve the safety of the batteries is an urgent technical problem to be solved in the battery technology.

SUMMARY OF THE INVENTION

An objective of the present application is to provide a battery cell, a battery and a power consuming device, which can reduce the deformation of a current collecting member and ensure the safety of the battery cell.

The present application is achieved by the following technical solutions.

In an aspect, the present application provides a battery cell, comprising:

an electrode assembly, comprising a main body portion and tabs extending from the main body portion; and current collecting members, each comprising a guide section and a tab connecting section, wherein the tab connecting section is configured to be connected to a respective tab, the guide section is located on the side of the main body portion from which the tab extends and is configured to be connected to the tab connecting section, a fold is provided between the tab connecting section and the guide section, and the guide section comprises a first end and a second end opposite to each other in a first direction, which is an extending direction of the fold; and wherein the guide section is provided with a reinforcement portion which extends from the first end to the second end, such that when the tab connecting section is bent toward the guide section, the deformation of the guide section is reduced.

According to the battery cell of the embodiment of the present application, the extending direction of the reinforcement portion is consistent with the extending direction of the fold. Since the reinforcement portion extends from the first end to the second end, that is, the size of the reinforcement portion matches the size of the guide section in the extending direction of the fold, the guide section is reinforced as a whole by means of the reinforcement portion, so that when the tab connecting section is bent and flattened relative to the guide section, the deformation of the guide section is reduced, and it is avoided that the guide section compresses electrode plates of the electrode assembly to cause the electrode plates coated with active materials to be subjected to mechanical force, which otherwise causes the electrode plates to be separated from a separator or powder to be removed from the electrode plates and thus results in the risk of internal short circuit, so that the safety of the battery cell is ensured.

In some embodiments of the present application, the reinforcement portion and the guide section are provided separately from each other, the reinforcement portion and the tab connecting section are integrally formed with each other, and the reinforcement portion is connected to the guide section.

In the above solution, the reinforcement portion and the tab connecting section are integrally formed with each other, so that it is convenient to ensure the strength of the tab connecting section and the reinforcement portion; and the reinforcement portion and the guide section are provided separately from each other, the structure is simple and is easy to machine and manufacture.

In some embodiments of the present application, the guide section comprises a first surface facing the main body portion and a second surface facing away from the main body portion, and the reinforcement portion covers the first surface or the second surface.

In the above solution, there is a large contact area between the reinforcement portion and the guide section, so as to increase the strength of the guide section.

In some embodiments of the present application, the reinforcement portion and the guide section are stacked with each other, with edges of the reinforcement portion being aligned with edges of the guide section.

In the above solution, the edges of the reinforcement portion are aligned with the edges of the guide section, so that there is a large contact area between the reinforcement portion and the guide section, and the connection and positioning of the reinforcement portion and the guide section are also facilitated.

In some embodiments of the present application, the reinforcement portion is welded to the guide section, and a welded portion is formed after the reinforcement portion is welded to the guide section, the welded portion extending in the first direction.

In the above solution, the extending direction of the welded portion enables the strength of the guide section to be increased in the first direction.

In some embodiments of the present application, the guide section comprises a first surface facing the main body portion and a second surface facing away from the main body portion, and the reinforcement portion is located at the second surface.

In the above solution, the reinforcement portion is arranged away from the main body portion, so as to avoid leaving welding slag on the side of the guide section close to the main body portion, which otherwise damages the main body portion.

In some embodiments of the present application, the reinforcement portion is integrally formed with the guide section.

In the above solution, the reinforcement portion and the guide section are integrally formed with each other to ensure that the guide section has a high strength.

In some embodiments of the present application, the reinforcement portion is a protrusion formed on the guide section.

In the above solution, the reinforcement portion is formed at the guide section to increase the strength of the guide section.

In some embodiments of the present application, the guide section comprises a first planar portion, a second planar portion and the reinforcement portion, wherein the first planar portion and the second planar portion are arranged coplanar with each other; the reinforcement portion is arranged between the first planar portion and the second planar portion and is connected to the first planar portion and the second planar portion; the first planar portion, the reinforcement portion and the second planar portion are arranged in sequence in a second direction which is perpendicular to the first direction; and the reinforcement portion protrudes from the first planar portion and the second planar portion.

In the above solution, the reinforcement portion protrudes from the first planar portion and the second planar portion to ensure that the first planar portion and the second planar portion both have a high strength, and the overall strength of the guide section is high.

In some embodiments of the present application, the current collecting member further comprises a terminal connecting section, a first overcurrent fuse portion and a second overcurrent fuse portion, wherein the terminal connecting section is configured to be connected to an electrode terminal; and one end of the first planar portion is connected to the terminal connecting section via the first overcurrent fuse portion, and one end of the second planar portion is connected to the terminal connecting section via the second overcurrent fuse portion.

In the above solution, the provision of the first overcurrent fuse portion and the second overcurrent fuse portion improves the use safety of the battery cell.

In some embodiments of the present application, the reinforcement portion comprises a bottom wall, a first side wall and a second side wall, wherein the first side wall and the second side wall are arranged opposite to each other in the second direction, the first side wall is connected to the first planar portion, the second side wall is connected to the second planar portion, and the bottom wall is connected to the first side wall and the second side wall to form a U-shaped structure.

In the above solution, the reinforcement portion is U-shaped, is easy to machine and has a good strength.

In some embodiments of the present application, the reinforcement portion protrudes toward the main body portion and abuts against the main body portion.

In the above solution, the reinforcement portion protrudes toward the main body portion, facilitating the fixing of the main body portion and ensuring the assembly stability of the battery cell.

In some embodiments of the present application, the tab connecting section is integrally formed with the guide section.

In the above solution, the tab connecting section and the guide section are integrally formed with each other to ensure the connection strength between the tab connecting section and the guide section.

In some embodiments of the present application, an indentation is provided at the fold, and after the tab connecting section is bent along the indentation, part of the tab connecting section is parallel to the guide section.

In the above solution, the provision of the indentation facilitates guiding the bending of the tab connecting section.

In some embodiments of the present application, the indentation has a depth of 20% to 60% of the thickness of the tab connecting section.

In the above solution, the depth of the indentation is selected such that it is possible to ensure that the tab connecting section is parallel to the guide section after being bent, so as to reduce the space occupied by the tab connecting section after being bent.

In another aspect, the present application also provides a battery, comprising a battery cell as described above.

In still another aspect, the present application also provides a power consuming device, comprising a battery as described above, the battery being configured to provide electric energy.

Additional aspects and advantages of the present application will be set forth in part in the following description, and in part will be apparent from the following description, or may be learned by practice of the present application.

BRIEF DESCRIPTION OF THE DRAWINGS

In order to more clearly illustrate the technical solutions of embodiments of the present application, the drawings to be used in the description of the embodiments of the present application will be described briefly below. Obviously, the drawings in the following description are merely some embodiments of the present application. For those of ordinary skill in the art, other drawings can also be obtained according to these drawings without any creative effort.

Figure 1:
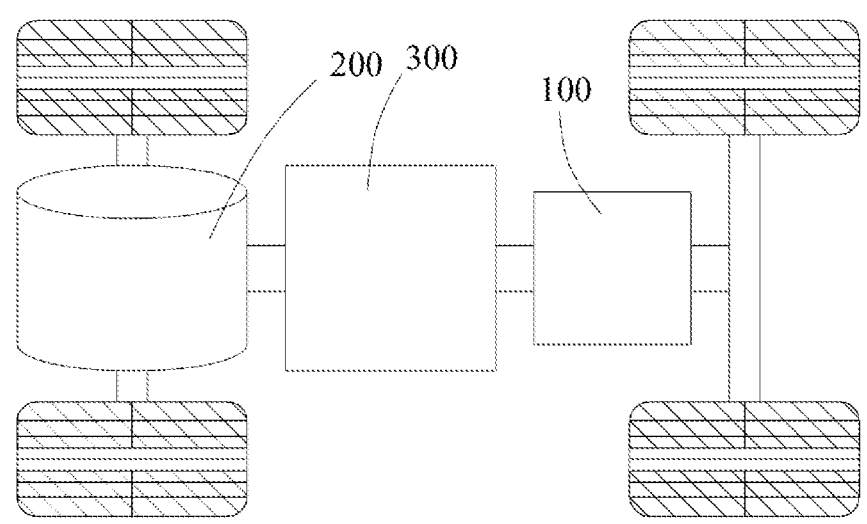
FIG. 1 is a schematic structural diagram of a vehicle provided in an embodiment of the present application.

In the accompanying drawings, the figures are not drawn to scale.

List of reference numerals: 100—Battery; 101—Case; 1011—First part; 1012—Second part; 1—Battery cell; 11—Housing; 12—End cap; 13—Electrode terminal; 14—Electrode assembly; 141—Main body portion; 142—Tab; 15—Current collecting member; 150—Reinforcement portion; 1501—Bottom wall; 1502—First side wall; 1503—Second side wall; 151—Guide section; 1511—First end; 1512—Second end; 1513—First surface; 1514—Second surface; 1515—First planar portion; 1516—Second planar portion; 152—Tab connecting section; 153—Terminal connecting section; 154—Fold; 155—Welded portion; 156—First overcurrent fuse portion; 1561—First notch; 157—Second overcurrent fuse portion; 1571—Second notch; 158—Slot; 159—Indentation; 200—Motor; 300—Controller; and 1000—Vehicle.

DETAILED DESCRIPTION OF EMBODIMENTS

In order to make the objectives, technical solutions and advantages of embodiments of the present application clearer, the technical solutions in the embodiments of the present application will be clearly and completely described below with reference to the accompanying drawings in the embodiments of the present application. Obviously, the described embodiments are some of, rather than all of, the embodiments of the present application. Generally, the assemblies of the embodiments of the present application described and illustrated in the drawings herein may be arranged and designed in a variety of different configurations.

Unless otherwise defined, all technological and scientific terms used herein have the same meanings as those commonly understood by those skilled in the art to which the present application belongs. The terms used in the description of the present application herein are merely for the purpose of describing specific embodiments, but are not intended to limit the present application. The terms "comprise" and "have" and any variations thereof in the specification and the claims of the present application as well as the foregoing description of the accompanying drawings are intended to cover non-exclusive inclusions.

The phrase "embodiment" mentioned to herein means that the specific features, structures and characteristics described in conjunction with the embodiment may be included in at least one of the embodiments of the present application. The phrase at various locations in the specification does not necessarily refer to the same embodiment, or an independent or alternative embodiment exclusive of another embodiment. Those skilled in the art understand explicitly or implicitly that an embodiment described herein may be combined with another embodiment.

It should be noted that like numerals and letters refer to like items in the following figures, so once an item is defined in one figure, it does not require further definition and explanation in subsequent figures.

In the description of the present application, it should be understood that orientation or position relationships indicated by terms such as "center", "length", "width", "thickness", "bottom", "inside", "outside", and "circumferential" are based on orientation or position relationships shown in the accompanying drawings and are merely for ease of description of the present application and simplification of the description, rather than indicating or implying that the apparatuses or elements referred to must have a specific orientation or be constructed and operated in a specific orientation, and therefore cannot be construed as limiting the present application. In addition, the terms "first", "second" and the like in the specification and the claims of the present application or in the above accompanying drawings are used to distinguish different objects, rather than to describe a specific order. Therefore, a feature defined by "first" or "second" may explicitly or implicitly include one or more features. In the description of the present application, the meaning of "a plurality of" is two or more, unless otherwise indicated.

In the description of the present application, it should be noted that unless otherwise explicitly specified and defined, the terms "mounting", "connecting" and "connection" should be understood in a broad sense, for example, they may be a fixed connection, a detachable connection, or an integrated connection; or may be a mechanical connection or an electrical connection; may be a direct connection, an indirect connection by means of an intermediate medium, or internal communication between two elements. For those of ordinary skill in the art, the specific meaning of the terms mentioned above in the present application can be construed according to specific circumstances.

In the present application, the battery cell may include a lithium ion secondary battery, a lithium ion primary battery, a lithium sulfur battery, a sodium lithium ion battery, a sodium ion battery or a magnesium ion battery and so on, which will not be limited in the embodiments of the present application. The battery cell may be cylindrical, flat, cuboid or in another shape, which is also not limited in the embodiments of the present application. The battery cells are generally classified into three types depending on the way of packaging: cylindrical battery cells, prismatic battery cells and pouch battery cells, which are also not limited in the embodiments of the present application.

A battery mentioned in the embodiments of the present application refers to a single physical module comprising one or more battery cells to provide a higher voltage and capacity. For example, the battery mentioned in the present application may include a battery module or a battery pack, etc. The battery generally comprises a case for packaging one or more battery cells. The case can prevent liquid or other foreign matters from affecting the charging or discharging of the battery cell.

The battery cell comprises an electrode assembly and an electrolyte, the electrode assembly being composed of a positive electrode plate, a negative electrode plate and a separator. The operation of the battery cell mainly relies on the movement of metal ions between the positive electrode plate and the negative electrode plate. The positive electrode plate comprises a positive electrode current collector and a positive electrode active material layer. The positive electrode active material layer is coated on a surface of the positive electrode current collector, and the current collector not coated with the positive electrode active material layer protrudes from the current collector coated with the positive electrode active material layer and is used as a positive electrode tab. Taking a lithium ion battery as an example, the positive electrode current collector may be made of aluminum, and the positive electrode active material may be lithium cobalt oxides, lithium iron phosphate, ternary lithium or lithium manganate, etc. The negative electrode plate comprises a negative electrode current collector and a negative electrode active material layer. The negative electrode active material layer is coated on a surface of the negative electrode current collector, and the current collector not coated with the negative electrode active material layer protrudes from the current collector coated with the negative electrode active material layer and is used as a negative electrode tab. The negative electrode current collector may be made of copper, and the negative electrode active material may be carbon or silicon, etc. In order to ensure that no fusing occurs when a large current passes, a plurality of positive electrode tabs are provided and are stacked together, and a plurality of negative electrode tabs are provided and are stacked together. The material of the separator may be PP (polypropylene) or PE (polyethylene), etc. In addition, the electrode assembly may have a winding structure or may have a laminated structure, which is not limited in the embodiments of the present application.

A main body portion of the electrode assembly may be formed by laminating or winding a positive electrode plate, a negative electrode plate and a separator positioned between the positive electrode plate and the negative electrode plate together, wherein the separator is an insulator between the positive electrode plate and the negative electrode plate.

The battery cell further comprises current collecting members and electrode terminals. Each current collecting member comprises a tab connecting section configured to be connected to the electrode assembly, and a guide section configured to be connected to a respective electrode terminal, so as to guide electric energy out of the electrode assembly through the electrode terminal. Correspondingly, the electrode terminal connected to the positive electrode tab is a positive electrode terminal, and the electrode terminal connected to the negative electrode tab is a negative electrode terminal.

At present, in order to facilitate the assembly of the battery cell and save the space occupied by the current collecting members, after the tab connecting sections are welded to the tabs, the tab connecting sections are bent and flattened relative to the guide sections to reduce the space occupied by the current collecting members. However, when the tab connecting sections of the current collecting members are bent and flattened after being connected to the tabs, the guide sections of the current collecting members are likely to be greatly deformed, and the electrode plates of the electrode assembly are likely to be compressed, thereby causing the risk of internal short circuit.

Specifically, when the current collecting member is bent and flattened, part of the stress will be directly transmitted to the guide section after the tab connecting section is compressed, and when the strength of the guide section is insufficient, the guide section will be deformed in a direction approaching the electrode assembly to compress the electrode assembly, so that the guide section will apply pressure on at least part of the electrode plates in the electrode assembly, and thus the electrode plates coated with the active materials are likely to be subjected to mechanical force to cause the electrode plates to be separated from the separator or powder to be removed from the electrode plates, thereby resulting in the risk of internal short circuit, and affecting the electrochemical performance and the safety of the battery cell.

In view of this, the present application provides a technical solution in which a fold is provided between the tab connecting section and the guide section and extends in a first direction, and the guide section comprises a first end and a second end opposite to each other in the first direction and is provided with a reinforcement portion extending from the first end to the second end. That is, the size of the reinforcement portion matches the size of the guide section in the extending direction of the fold.

With such configuration, when the current collecting member is bent and flattened, the deformation of the guide section can be reduced. Specifically, the ability of the guide section to resist deformation is determined by the weakest part. When the tab connecting section is bent and flattened relative to the guide section, it is necessary to increase the strength of the entire guide section in the extending direction of the fold, otherwise the guide section will deform at its weak position. Since the reinforcement portion in the solution of the present application extends from the first end to the second end of the guide section, that is, the reinforcement portion completely covers the guide section in the first direction, the deformation of the guide section can be effectively avoided when the current collecting member is bent and flattened. Since the strength of the guide section is enhanced as a whole in the first direction in the solution of the present application, when the current collecting member is bent, the risk of internal short circuit due to that the guide section is deformed to compress the electrode plates of the electrode assembly can undoubtedly be avoided, thereby ensuring the safety of battery cell.

The technical solutions described in the embodiments of the present application are all applicable to various devices using batteries, such as mobile phones, portable devices, notebook computers, electromobile, electric toys, electric power tools, electric vehicles, ships and space vehicles. For example, the space vehicles include airplanes, rockets, space shuttles and spacecrafts, etc.

It should be understood that the technical solutions described in the embodiments of the present application are not only applicable to the devices described above, but also applicable to all devices using a battery. However, for the sake of brevity of description, the following embodiments will be described taking an electric vehicle as an example.

For example, FIG. 1 shows a schematic structural diagram of a vehicle 1000 according to an embodiment of the present application. The vehicle 1000 may be a fuel vehicle, a gas vehicle or a new-energy vehicle. The new-energy vehicle may be a battery electric vehicle, a hybrid vehicle, an extended-range vehicle, etc. A battery 100 may be provided inside the vehicle 1000. For example, the battery 100 may be provided at the bottom or the head or the tail of the vehicle 1000. The battery 100 may be configured to supply power to the vehicle 1000. For example, the battery 100 can serve as an operating power supply of the vehicle 1000 for use in a circuit system of the vehicle 1000, for example, to meet a working power demand of the vehicle 1000 during startup, navigation and running. In another embodiment of the present application, the battery 100 can not only serve as an operating power supply for the vehicle 1000, but can also serve as a driving power supply for the vehicle 1000, instead of or partially instead of fuel or natural gas, to provide driving power for the vehicle 1000.

A motor 200 and a controller 300 may be further provided inside the vehicle 1000. The controller 300 is configured to control the battery 100 to supply power to the motor 200, for example, to meet the working power demand of the vehicle 1000 during startup, navigation and traveling.

In order to meet different power demands, the battery 100 may comprise a plurality of battery cells which may be in series connection, parallel connection or series-parallel connection. The series-parallel connection refers to a combination of series connection and parallel connection. The battery 100 may also be referred to as a battery pack. In some embodiments, the plurality of battery cells may be in series connection or in parallel connection or in series-parallel connection to constitute a battery module, and then a plurality of battery modules may be in series connection or in parallel connection or in series-parallel connection to constitute the battery 100. That is to say, a plurality of battery cells may directly constitute a battery 100, or may constitute battery modules, which then constitute a battery 100.

Figure 2:
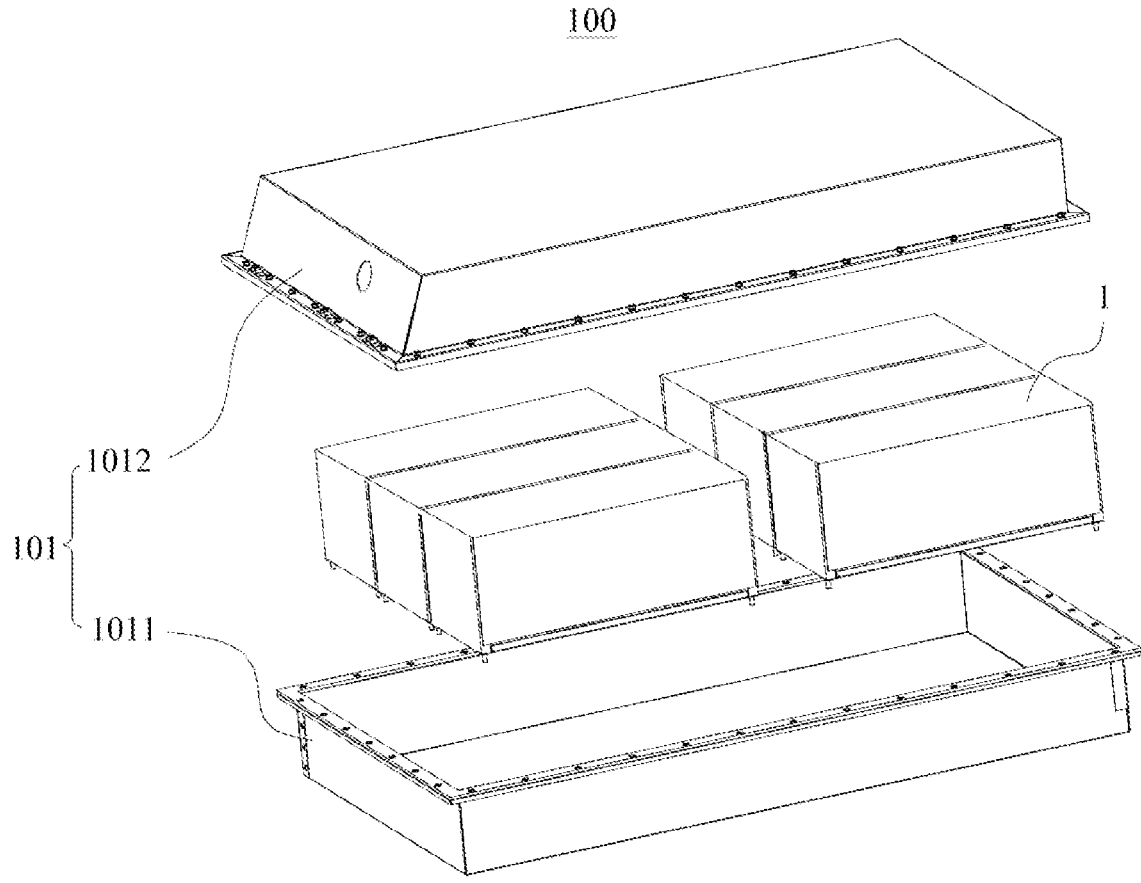
FIG. 2 is a schematic structural diagram of a battery provided in an embodiment of the present application.

FIG. 2 is a schematic structural diagram of a battery 100 according to an embodiment of the present application. In FIG. 2, the battery 100 may comprise a plurality of battery cells 1 and a case 101, the interior of the case 101 is of a hollow structure, and the plurality of battery cells 1 are received in the case 101. The case 101 comprises a first part 1011 and a second part 1012. The first part 1011 comprises an accommodating space with an opening. The second part 1012 is configured to cover the opening of the accommodating space, so as to be connected to the first part 1011 to form an accommodating cavity for accommodating a plurality of battery cells 1.

Figures 3, 4:
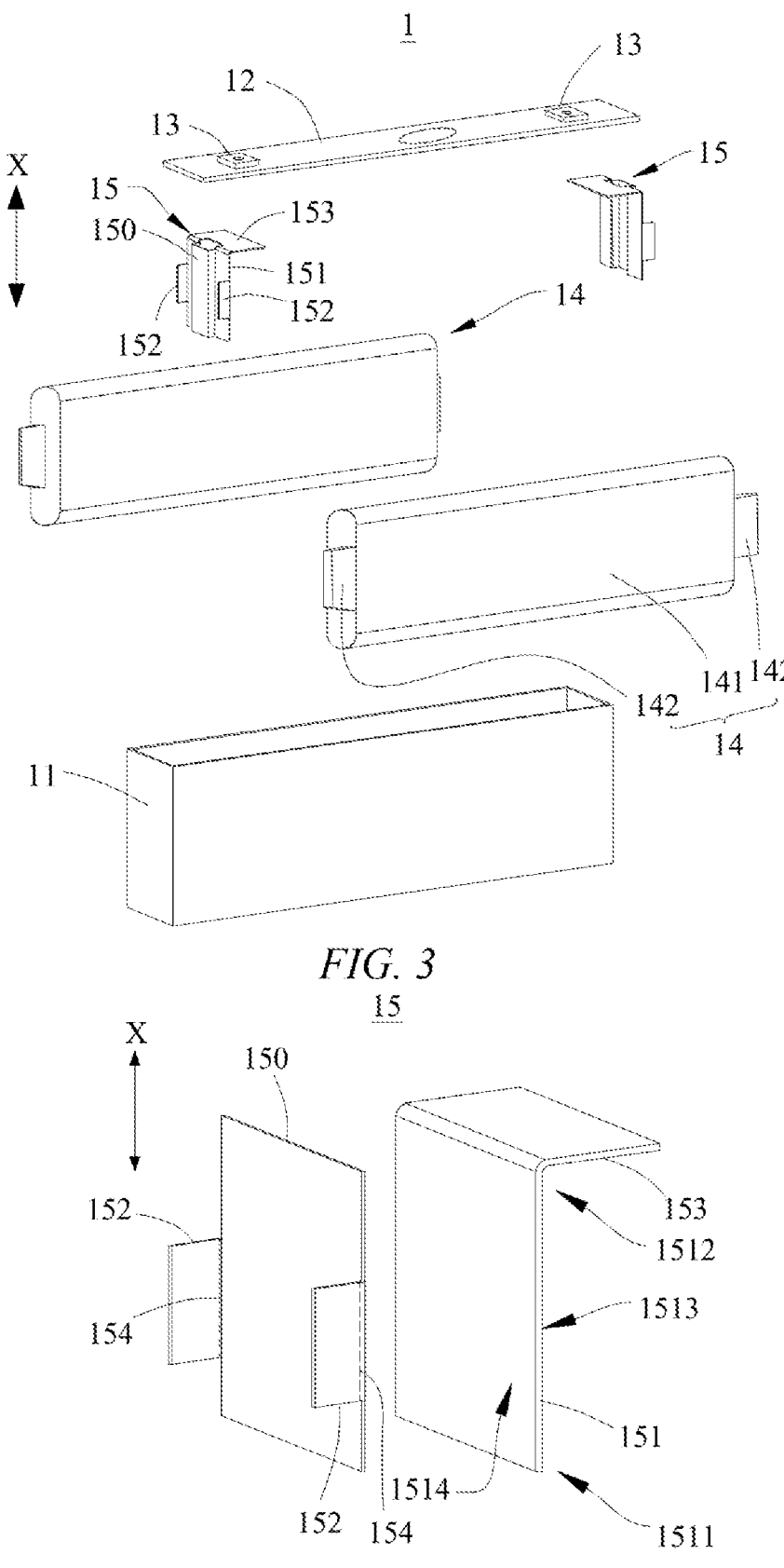
FIG. 3 is an exploded view of a battery cell provided in an embodiment of the present application.
FIG. 4 is a schematic structural diagram of a current collecting member provided in an embodiment of the present application.

FIG. 3 shows an exploded view of a battery cell 1 according to an embodiment of the present application. In FIG. 3, the battery cell 1 comprises a housing 11, an end cap 12, electrode terminals 13, an electrode assembly 14 and current collecting members 15.

The housing 11 has an opening so that the electrode assembly 14 is received inside the housing 11. The end cap 12 is configured to cover the opening of the housing 11, so as to form, with the housing 11, a cavity for accommodating the electrode assembly 14.

The housing 11 is shaped according to the combined shape of one or more electrode assemblies 14. For example, the housing 11 may be a hollow cuboid, a hollow cube, or a hollow cylinder. For example, as shown in FIG. 3, the housing 11 is a hollow cuboid.

The housing 11 may be made of an electrically conductive metal material or plastic. Optionally, the housing 11 is made of aluminum or an aluminum alloy.

Two electrode terminals 13 are provided. The two electrode terminals 13 are provided on the end cap 12, and the two electrode terminals 13 are respectively a positive electrode terminal and a negative electrode terminal. The electrode assembly 14 comprises a main body portion 141 and two tabs 142 extending from the main body portion 141, and the current collecting members 15 are configured to connect the electrode terminals 13 to the tabs 142. The two tabs 142 are respectively a positive electrode tab and a negative electrode tab. The positive electrode tab is connected to the positive electrode terminal via one of the current collecting members 15, and the negative electrode tab is connected to the negative electrode terminal via the other current collecting member 15.

In FIG. 3, two electrode assemblies 14 are provided. The positive electrode tabs of the two electrode assemblies 14 are configured to be connected to one of the current collecting members 15, and the negative electrode tabs of the two electrode assemblies 14 are configured to be connected to the other current collecting member 15.

FIG. 4 shows a schematic structural diagram of a current collecting member 15 according to an embodiment of the present application. As shown in FIGS. 3 and 4, the current collecting member 15 comprises a guide section 151 and two tab connecting sections 152. The tab connecting section 152 is configured to be connected to a respective tab 142. For example, one of the tab connecting sections 152 is welded to the tab 142 of one of the electrode assemblies 14, and the other tab connecting section 152 is welded to the tab 142 of the other electrode assembly 14. The guide section 151 is located on the side of the main body portion 141 from which the tab 142 extends, and is configured to be connected to the tab connecting sections 152. A fold 154 is provided between each tab connecting section 152 and the guide section 151. The guide section 151 comprises a first end 1511 and a second end 1512 opposite to each other in a first direction X, which first direction X is the extending direction of the fold 154. The guide section 151 is provided with a reinforcement portion 150. The reinforcement portion 150 extends from the first end 1511 to the second end 1512, such that when the tab connecting sections 152 are bent toward the guide section 151, the deformation of the guide section 151 is reduced. It should be noted that, as shown in FIG. 3, the first direction X can also be understood as the height direction of the battery cell 1, or, as shown in FIG. 4, the first direction X can also be understood as the length direction of the guide section 151.

According to the battery cell 1 of the embodiment of the present application, the extending direction of the reinforcement portion 150 is consistent with the extending direction (the first direction X) of the fold 154, and the reinforcement portion 150 extends from the first end 1511 to the second end 1512. That is, the size of the reinforcement portion 150 matches the size of the guide section 151 in the first direction X, and the reinforcement portion 150 completely covers the guide section 151 in the first direction X, so that the overall strength of the guide section 151 is enhanced in the first direction X. When the tab connecting sections 152 are bent and flattened relative to the guide section 151, it is avoided that the guide section 151 is deformed to compress the electrode plates of the electrode assembly 14 to cause the electrode plates coated with the active materials to be subjected to mechanical force, which otherwise causes the electrode plates to be separated from the separator or powder to be removed from the electrode plates and thus results in the risk of internal short circuit, so that the electrochemical performance and the safety of the battery cell 1 are ensured.

It should be noted that, after the tab connecting sections 152 are bent relative to the guide section 151, it can be understood that the main body portion 141 and the tab connecting sections 152 are respectively located on two sides of the guide section 151 in the thickness direction thereof. The two tab connecting sections 152 in FIG. 4 are distributed at two ends of the guide section 151 in the width direction of the guide section 151.

As shown in FIGS. 3 and 4, the guide section 151 comprises a first surface 1513 facing the main body portion 141 and a second surface 1514 facing away from the main body portion 141.

Still referring to FIGS. 3 and 4, the current collecting member 15 further comprises a terminal connecting section 153. The terminal connecting section 153 is configured to connect a respective electrode terminal 13 and the guide section 151, so as to facilitate guiding the electric energy out of the electrode assembly 14 through the electrode terminal 13. The terminal connecting section 153 is connected to the second end 1512 of the guide section 151. For example, the terminal connecting section 153 may be integrally formed with the guide section 151, or the terminal connecting section 153 and the guide section 151 may be provided separately from each other, and are then connected to each other by welding, riveting or by means of electrically conductive glue, or the like. At the second end 1512 of the guide section 151, the terminal connecting section 153 extends in a direction directed from the second surface 1514 toward the first surface 1513, so as to facilitate connection with the electrode terminal 13.

Figure 5:
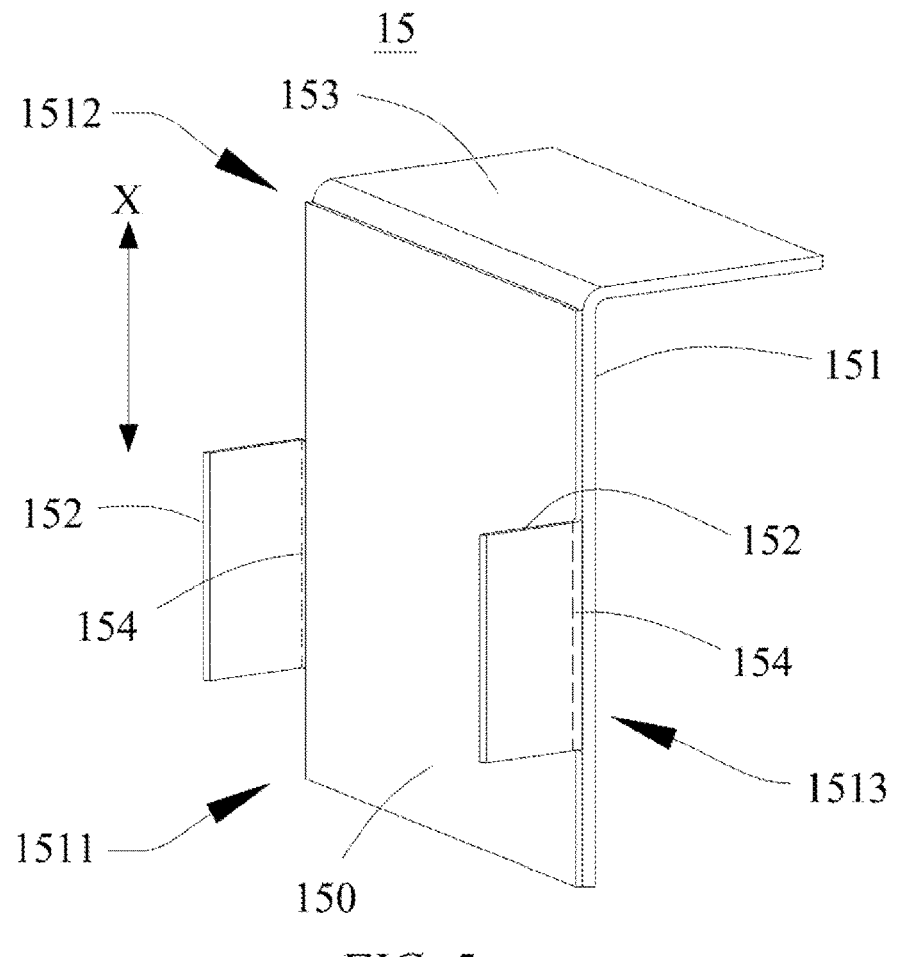
FIG. 5 is a schematic diagram of a reinforcement portion assembled with a guide section provided in an embodiment of the present application.

In some embodiments of the present application, as shown in FIG. 4, the reinforcement portion 150 may be provided separately from the guide section 151. FIG. 5 shows a schematic diagram of a reinforcement portion 150 assembled with a guide section 151 according to an embodiment of the present application. As shown in FIG. 5, the reinforcement portion 150 is connected to the guide section 151 to increase the strength of the guide section 151.

In some embodiments, the reinforcement portion 150 may be integrally formed with the tab connecting sections 152, so that the structure is simple and is easy to manufacture. In other embodiments of the present application, it is also possible that the reinforcement portion 150 and the tab connecting sections 152 are provided separately from each other, and are then connected to each other by welding, riveting or by means of electrically conductive glue, or the like.

In some embodiments of the present application, as shown in FIGS. 4 and 5, the reinforcement portion 150 may cover the second surface 1514. It can be understood that the reinforcement portion 150 is attached to the second surface 1514, and there is a large contact area between the reinforcement portion 150 and the second surface 1514, so that the assembled structure of the reinforcement portion 150 and the guide section 151 has a higher strength, and the deformation of the guide section 151 is effectively reduced when the tab connecting sections 152 are bent and flattened.

In some embodiments of the present application, the reinforcement portion 150 may completely cover the second surface 1514. As shown in FIG. 5, the reinforcement portion 150 and the guide section 151 are stacked with each other, with edges of the reinforcement portion 150 being aligned with edges of the guide section 151, which can be understood that the size of the reinforcement portion 150 matches that of the guide section 151, and the reinforcement portion 150 coincides with the guide section 151. The reinforcement portion 150 and the guide section 151 are stacked in the thickness direction of the guide section 151, and the edges of the reinforcement portion 150 are aligned with the edges of the guide section 151, so that there is a large contact area between the reinforcement portion 150 and the guide section 151, and the connection and positioning of the reinforcement portion 150 and the guide section 151 are also facilitated.

Figure 6:
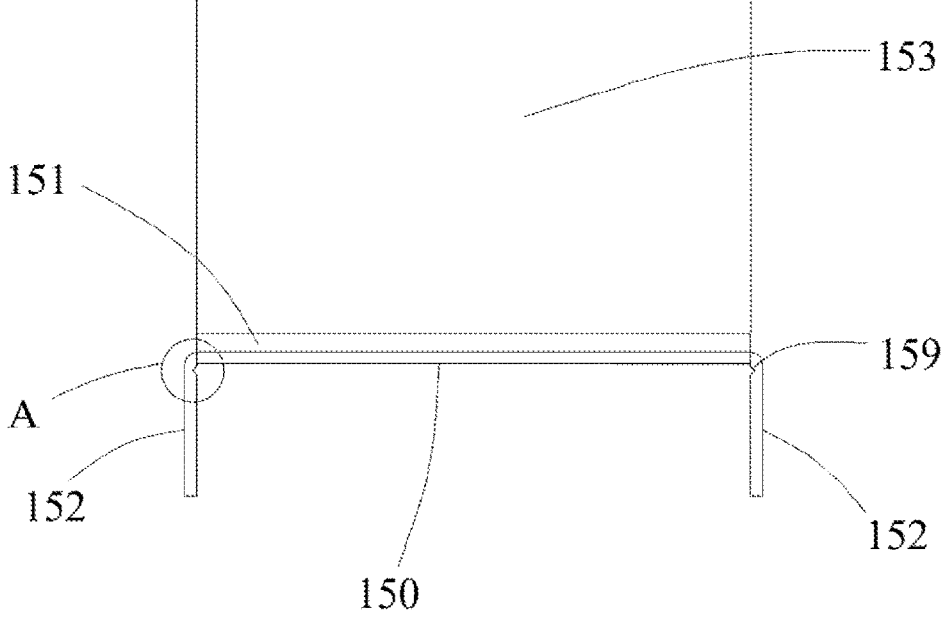
FIG. 6 is a schematic diagram of an indentation of a current collecting member according to an embodiment of the present application.
Figure 7:
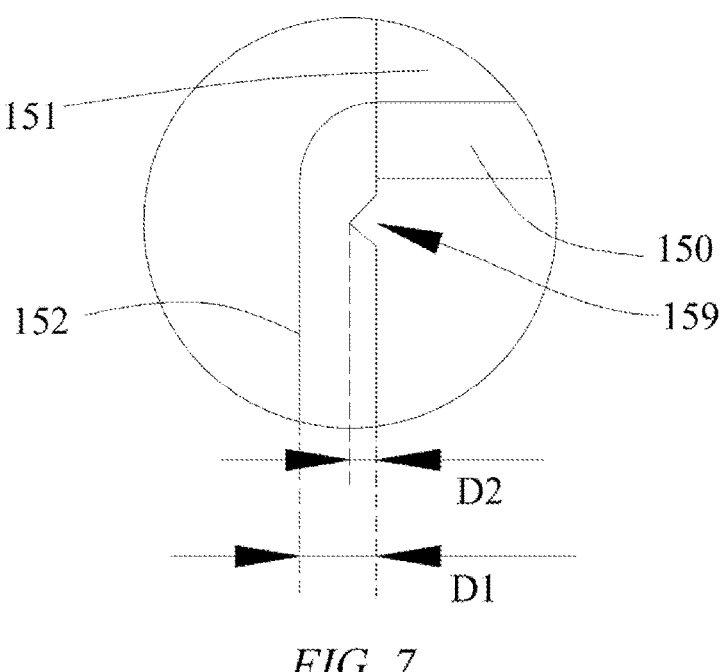
FIG. 7 is an enlarged view of part A of FIG. 6.

FIG. 6 shows a schematic diagram of an indentation 159 of a current collecting member 15 according to an embodiment of the present application, which can be understood as a top view of FIG. 5, and FIG. 7 is an enlarged view of part A in FIG. 6. In some embodiments of the present application, as shown in FIGS. 5 to 7, the indentation 159 is provided at the fold 154, and after the tab connecting section 152 is bent along the indentation 159, part of the tab connecting section 152 is parallel to the guide section 151. That is, before the tab connecting section 152 is bent, the end of the tab connecting section 152 close to the guide section 151 is provided with an indentation 159. It can be understood that the thickness of the tab connecting section 152 is relatively thin at the indentation 159, facilitating guiding the bending of the tab connecting section 152.

For example, as shown in FIG. 7, the indentation 159 may be a V-shaped notch, and before the tab connecting section 152 is bent, an opening of the V-shaped notch is large. After the tab connecting section 152 is bent relative to the guide section 151, the opening of the V-shaped notch is reduced due to the bending deformation of the tab connecting section 152, and at this time, the opening of the V-shaped notch is small. The process of bending the tab connecting section 152 toward the guide section 151 can be understood as a process of reducing the V-shaped opening.

Figure 8:
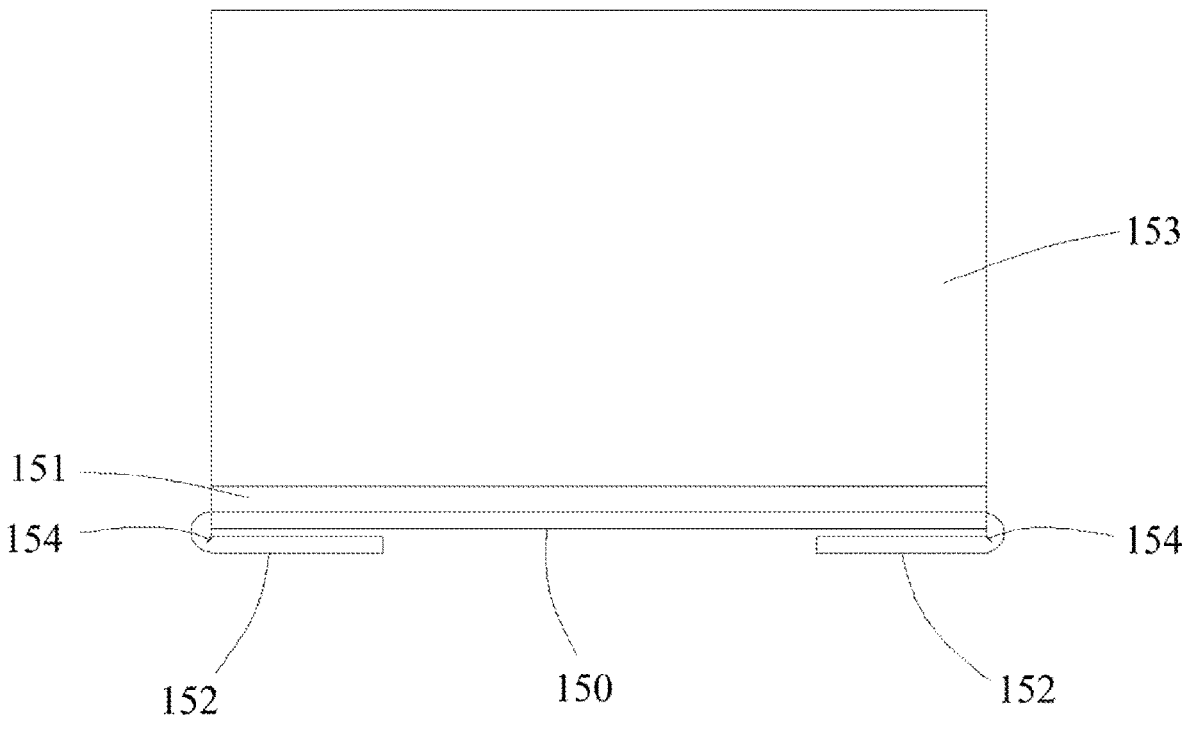
FIG. 8 is a schematic diagram of a tab connecting section after being bent according to an embodiment of the present application.

In some embodiments of the present application, as shown in FIG. 7, the indentation 159 has a depth D2 of 20% to 60% of the thickness D1 of the tab connecting section 152. If the depth D2 of the indentation 159 is small, it is difficult to bend the tab connecting section 152. After the tab connecting section 152 is bent, there is a large included angle between the tab connecting section 152 and the guide section 151, thereby occupying a large space. If the depth D2 of the indentation 159 is large, the connection strength between the tab connecting section 152 and the guide section 151 is weak, and the connection between the tab connecting section 152 and the guide section 151 is likely to be broken during the bending process, thereby damaging the current collecting member 15. The depth D2 of the indentation 159 is selected such that the space occupied by the tab connecting section 152 is reduced after being bent. For example, FIG. 8 shows a schematic diagram of the tab connecting section 152 after being bent according to an embodiment of the present application. As shown in FIG. 8, after the tab connecting section 152 is bent, most of the tab connecting section 152 except for the indentation 159 is parallel to the guide section 151, thereby reducing space occupation and increasing the energy density of the battery cell 1.

Figures 9, 10:
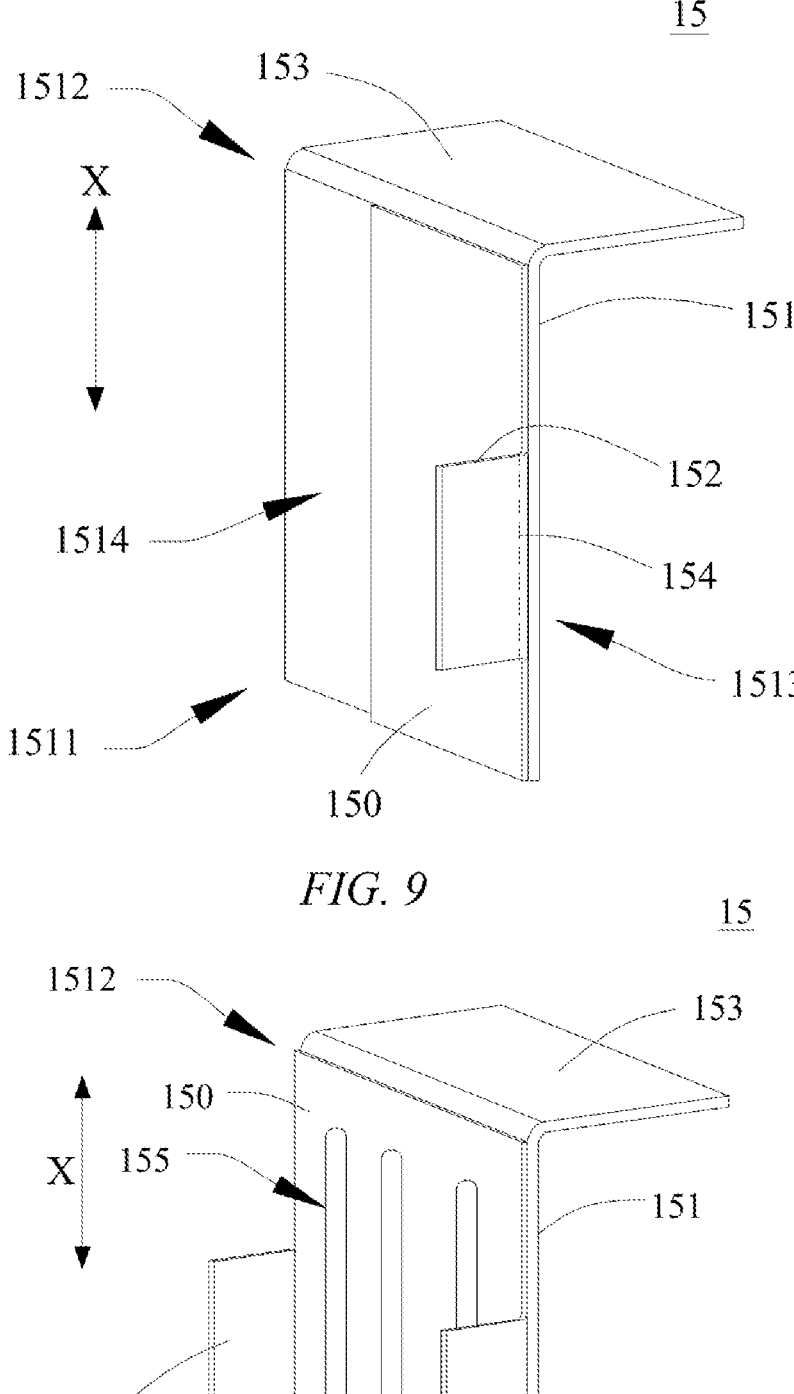
FIG. 9 is a schematic diagram of a reinforcement portion assembled with a guide section provided in another embodiment of the present application.
FIG. 10 is a schematic diagram of a reinforcement portion welded to a guide section provided in an embodiment of the present application.

FIG. 9 shows a schematic diagram of a reinforcement portion 150 assembled with a guide section 151 according to another embodiment of the present application. In some embodiments of the present application, as shown in FIG. 9, the reinforcement portion 150 may also partially cover the second surface 1514. That is, the reinforcement portion 150 completely covers the second surface 1514 in the first direction X, and the size of the reinforcement portion 150 is smaller than that of the second surface 1514 in the width direction of the guide section 151.

In some embodiments of the present application, as shown in FIG. 9, the current collecting member 15 may also have only one tab connecting section 152. When the battery cell 1 has only one electrode assembly 14, each current collecting member 15 only needs to be provided with one tab connecting section 152, thereby saving costs.

FIG. 10 shows a schematic diagram of the reinforcement portion 150 welded to the guide section 151 according to an embodiment of the present application. In some embodiments of the present application, as shown in FIG. 10, the reinforcement portion 150 is welded to the guide section 151, and a welded portion 155 is formed after the reinforcement portion 150 is welded to the guide section 151. The welded portion 155 extends in the first direction X. It can be understood that, a welded portion 155 is formed after the reinforcement portion 150 is welded to the guide section 151 in the first direction X, and the welded portion 155 can be understood as a weld mark. The welding of the reinforcement portion 150 to the guide section 151 can ensure the connection strength between the reinforcement portion 150 and the guide section 151, thereby enhancing the strength of the guide section 151. The welded portion 155 extends in the first direction X to increase the strength of the guide section 151 in the first direction X. Since the reinforcement portion 150 extends from the first end 1511 to the second end 1512, when the tab connecting section 152 is bent relative to the guide section 151, the deformation of the guide section 151 in the first direction can be reduced, thereby ensuring the safety of the battery cell 1. In other embodiments of the present application, it is also possible to connect the reinforcement portion 150 and the guide section 151 by riveting, or by means of electrically conductive glue, or the like.

In some embodiments of the present application, the reinforcement portion 150 is located at the second surface 1514, that is, the reinforcement portion 150 is arranged away from the main body portion 141. When the reinforcement portion 150 is welded to the guide section 151, the reinforcement portion 150 being located on the side of the guide section 151 away from the main body portion 141 avoids leaving welding slag on the side of the guide section 151 close to the main body portion 141, which otherwise causes the welding slag to damage the active material layer coated on the surface of the electrode plate and therefore the main body portion 141, and thus results in internal short circuit.

Figures 11, 12:
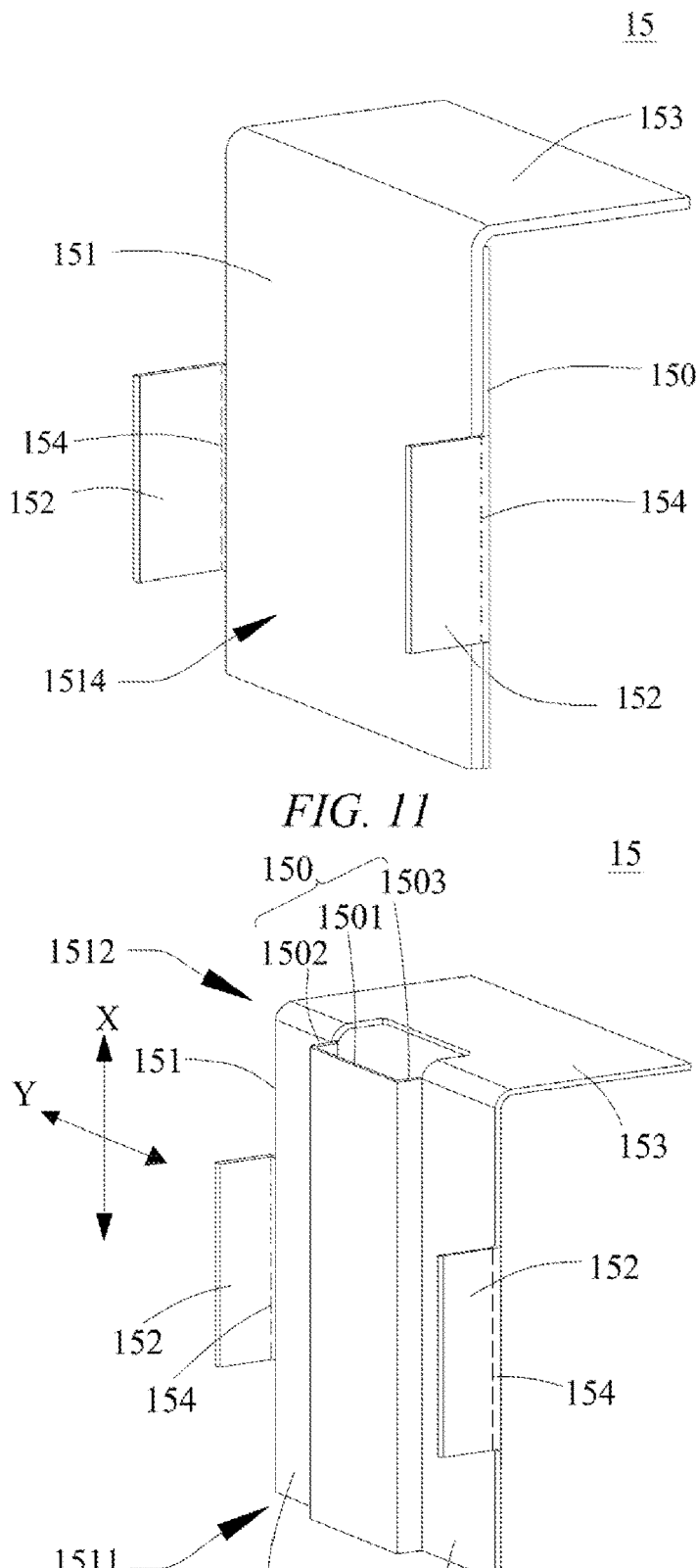
FIG. 11 is a schematic diagram of a reinforcement portion assembled with a guide section provided in still another embodiment of the present application.
FIG. 12 is a schematic structural diagram of a current collecting member provided in another embodiment of the present application.

FIG. 11 shows a schematic diagram of a reinforcement portion 150 assembled with a guide section 151 according to still another embodiment of the present application. In some embodiments of the present application, as shown in FIG. 11, the reinforcement portion 150 may alternatively cover the first surface 1513 (as shown in FIG. 4), and there is a large contact area between the reinforcement portion 150 and the first surface 1513, so that the strength of the guide section 151 is better increased.

FIG. 12 shows a schematic structural diagram of a current collecting member 15 provided in another embodiment of the present application. In some embodiments of the present application, as shown in FIG. 12, the reinforcement portion 150 may alternatively be integrally formed with the guide section 151, to ensure that the guide section 151 has a high strength.

In some embodiments of the present application, the reinforcement portion 150 is a protrusion formed on the guide section 151. For example, the reinforcement portion 150 may be formed on the guide section 151 by stamping. The reinforcement portion 150, which is a protrusion, is easy to machine. In some embodiments of the present application, still referring to FIG. 12, the reinforcement portion 150 may protrude away from the main body portion 141 (as shown in FIG. 3), which can be understood that the protruding direction of the reinforcement portion 150 is opposite to the extending direction of the terminal connecting section 153. When the reinforcement portion 150 protrudes away from the main body portion 141 and the reinforcement portion 150 has a protruding height not less than the thickness of the tab 142 and the tab connecting section 152 after being bent and flattened, the reinforcement portion can abut against other components (e.g., the housing 11 or the insulator) via the protruding part of the reinforcement portion 150, facilitating fixing of the reinforcement portion 150 to other components (e.g., the housing 11 or the insulator). The protruding height of the reinforcement portion 150 is determined according to the inner space of the housing 11. In order to ensure the energy density of the battery cell 1, the protruding height of the reinforcement portion 150 should not be too high.

In some embodiments of the present application, as shown in FIG. 12, the guide section 151 comprises a first planar portion 1515, a second planar portion 1516 and the reinforcement portion 150. The first planar portion 1515 and the second planar portion 1516 are arranged coplanar with each other, and the reinforcement portion 150 is arranged between the first planar portion 1515 and the second planar portion 1516 and is connected to the first planar portion 1515 and the second planar portion 1516. The first planar portion 1515, the reinforcement portion 150 and the second planar portion 1516 are arranged in sequence in a second direction Y, which second direction Y is perpendicular to the first direction X, and the reinforcement portion 150 protrudes from the first planar portion 1515 and the second planar portion 1516. Since the reinforcement portion 150, the first planar portion 1515 and the second planar portion 1516 are integrally formed with each other, a high overall strength of the guide section 151 is ensured.

As shown in FIG. 12, two tab connecting sections 152 are provided. The two tab connecting sections 152 are located at opposite ends of the guide section 151 in the second direction Y, one of the tab connecting sections 152 is connected to the first planar portion 1515, and the other tab connecting section 152 is connected to the second planar portion 1516.

Figures 13, 14:
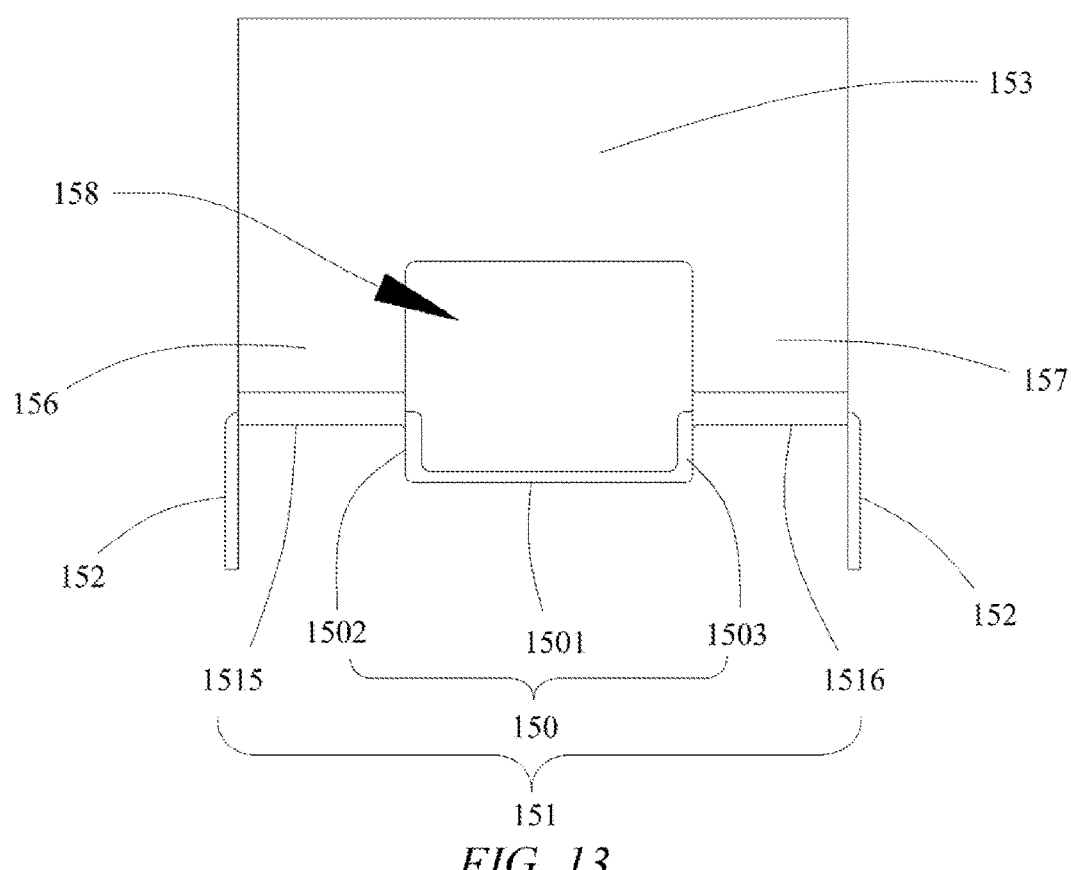
FIG. 13 is a top view of FIG. 12.
FIG. 14 is a schematic diagram of an indentation of a current collecting member provided in another embodiment of the present application.

FIG. 13 shows a schematic structural diagram of a reinforcement portion 150 of a current collecting member 15 according to an embodiment of the present application. It can be understood that FIG. 13 is a top view of FIG. 12. In some embodiments of the present application, as shown in FIGS. 12 and 13, the reinforcement portion 150 may be of a U-shaped structure. The reinforcement portion 150 comprises a bottom wall 1501, a first side wall 1502 and a second side wall 1503. The first side wall 1502 and the second side wall 1503 are arranged spaced apart from and opposite to each other in the second direction Y, the first side wall 1502 is connected to the first planar portion 1515, the second side wall 1503 is connected to the second planar portion 1516, and the bottom wall 1501 is connected to the first side wall 1502 and the second side wall 1503 to form the U-shaped structure. The U-shaped reinforcement portion 150 is easy to machine and has a good strength.

In some embodiments of the present application, as shown in FIGS. 12 and 13, the current collecting member 15 further comprises a first overcurrent fuse portion 156 and a second overcurrent fuse portion 157. In the first direction X, one end of the first planar portion 1515 is connected to the terminal connecting section 153 via the first overcurrent fuse portion 156, and one end of the second planar portion 1516 is connected to the terminal connecting section 153 via the second overcurrent fuse portion 157. For example, the first planar portion 1515, the first overcurrent fuse portion 156 and the terminal connecting section 153 are integrally formed with each other, and the second planar portion 1516, the second overcurrent fuse portion 157 and the terminal connecting section 153 are integrally formed with each other. It can be understood that, in the second direction Y, a slot 158 is provided between the first overcurrent fuse portion 156 and the second overcurrent fuse portion 157, so that the first overcurrent fuse portion 156 and the second overcurrent fuse portion 157 of the current collecting member 15 can be fused when the current is too large, improving the use safety of the battery cell 1. In other embodiments of the present application, when the terminal connecting section 153 and the guide section 151 are provided separately from each other, the first overcurrent fuse portion 156 may be connected to the first planar portion 1515 and the terminal connecting section 153 by welding, riveting, or by means of electrically conductive glue, or the like; and the second overcurrent fuse portion 157 may also be connected to the second planar portion 1516 and the terminal connecting section 153 by welding, riveting, or by means of electrically conductive glue, or the like.

It should be noted that when the current collecting member 15 is formed by stamping a plate, the slot 158 can be understood as the process slotting when the reinforcement portion 150 is formed from the current collecting member 15, so as to release the stress when the reinforcement portion 150 is formed, and facilitate the forming of the reinforcement portion 150 by stamping.

Figure 15:
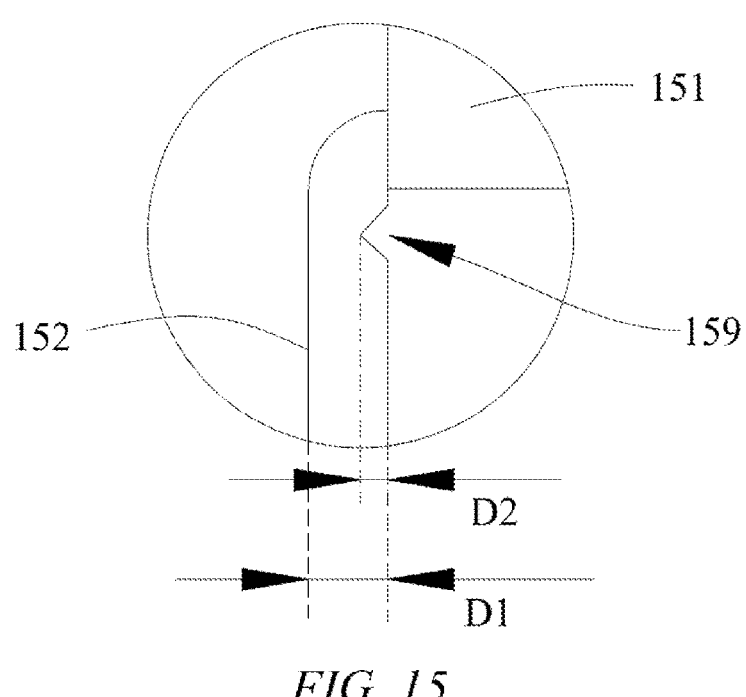
FIG. 15 is an enlarged view of part B of FIG. 14.
Figure 16:
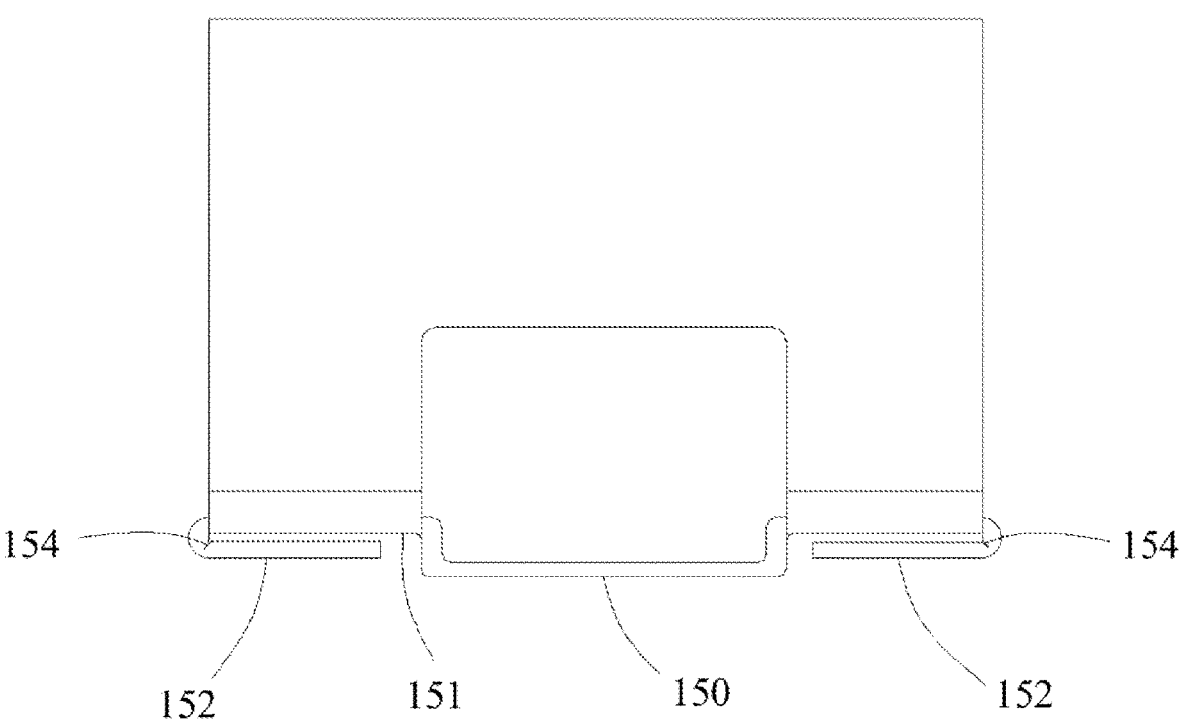
FIG. 16 is a schematic diagram of a tab connecting section after being bent provided in another embodiment of the present application.

FIG. 14 shows a schematic diagram of an indentation 159 of a current collecting member 15 according to another embodiment of the present application. FIG. 15 is an enlarged view of part B in FIG. 14. FIG. 16 shows a schematic diagram of a tab connecting section 152 after being bent according to another embodiment of the present application. As shown in FIGS. 14-16, a schematic diagram of the indentation 159 of the current collecting member 15 where the reinforcement portion 150 is integrally formed with the guide section 151 is shown. For the structure of the indentation 159, reference can be made to the description in the embodiment of the current collecting member 15 where the reinforcement portion 150 and the guide section 151 are provided separately from each other as described above, and will not be repeated here.

As shown in FIG. 16, the protruding height of the reinforcement portion 150 matches the bending space of the tab 142, such that the tab connecting section 152 does not interfere with the reinforcement portion 150 after the tab 142 is connected to the tab connecting section 152 and the tab connecting section 152 is bent relative to the guide section 151.

Figures 17, 18:
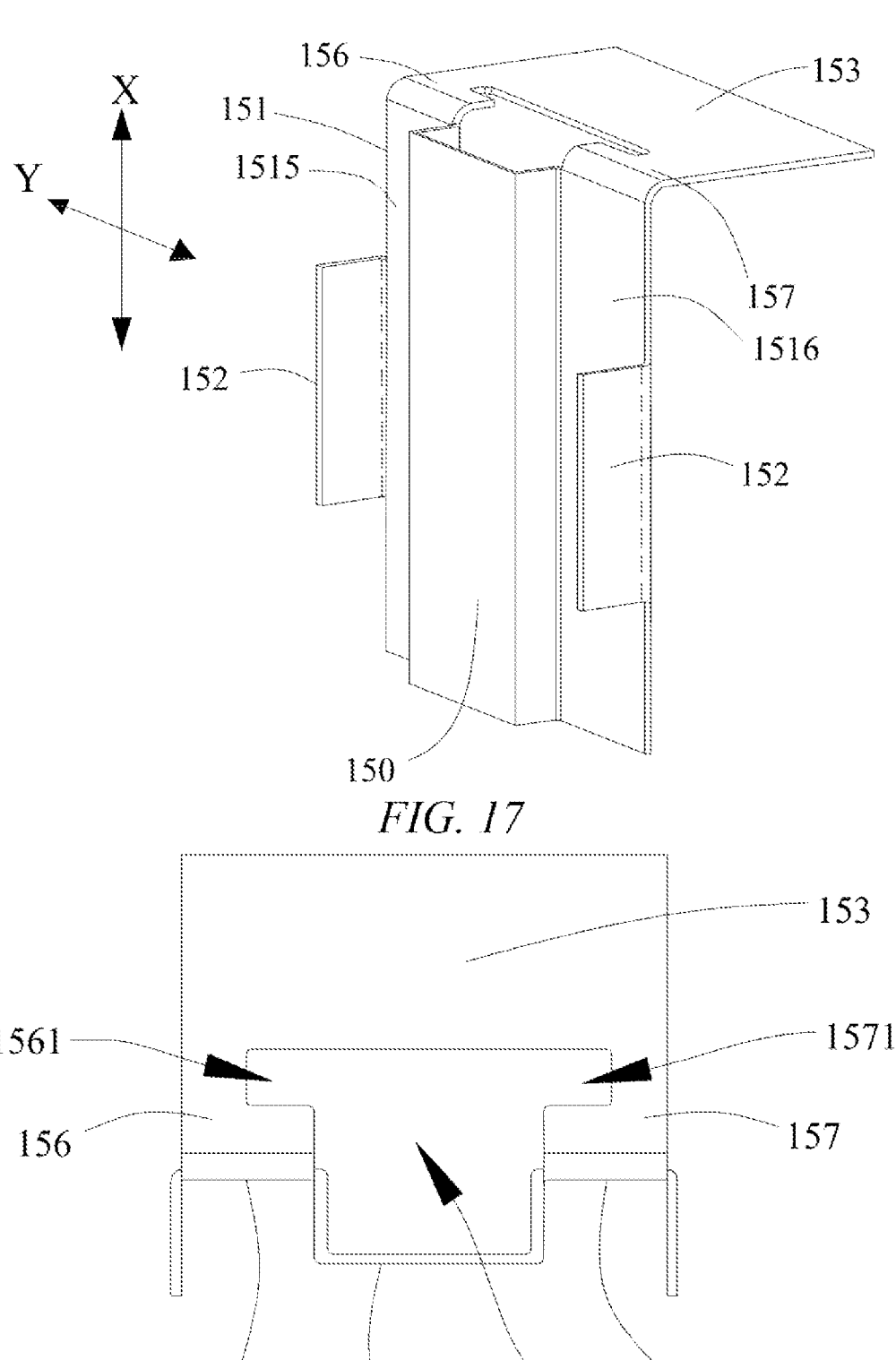
FIG. 17 is a schematic diagram of a guide section assembled with a terminal connecting section provided in an embodiment of the present application.
FIG. 18 is a top view of FIG. 17.

FIG. 17 shows a schematic diagram of a guide section 151 assembled with a terminal connecting section 153 according to an embodiment of the present application, and FIG. 18 shows a top view of a guide section 151 and a terminal connecting section 153 in an assembled state according to an embodiment of the present application. It can be understood that FIG. 18 is a top view of FIG. 17. In some embodiments of the present application, as shown in FIGS. 17 and 18, the first overcurrent fuse portion 156 is provided with a first notch 1561, and the second overcurrent fuse portion 157 is provided with a second notch 1571, so that the overcurrent areas of the first overcurrent fuse portion 156 and the second overcurrent fuse portion 157 are reduced, the safety of the current collecting member 15 is further improved, and it is convenient for the first overcurrent fuse portion 156 and the second overcurrent fuse portion 157 to be fused at a small current.

In some embodiments of the present application, the tab connecting section 152 is integrally formed with the guide section 151 to ensure the connection strength between the tab connecting section 152 and the guide section 151 and facilitate machining. The reinforcement portion 150 is integrally formed with the guide section 151, and the tab connecting section 152 is integrally formed with the guide section 151, so that the guide section 151 has a high strength. In other embodiments of the present application, it is also possible that the tab connecting section 152 and the guide section 151 are provided separately from each other, and the tab connecting section 152 may be connected to the guide section 151 by welding, riveting or by means of electrically conductive glue, or the like.

Figures 19, 20:
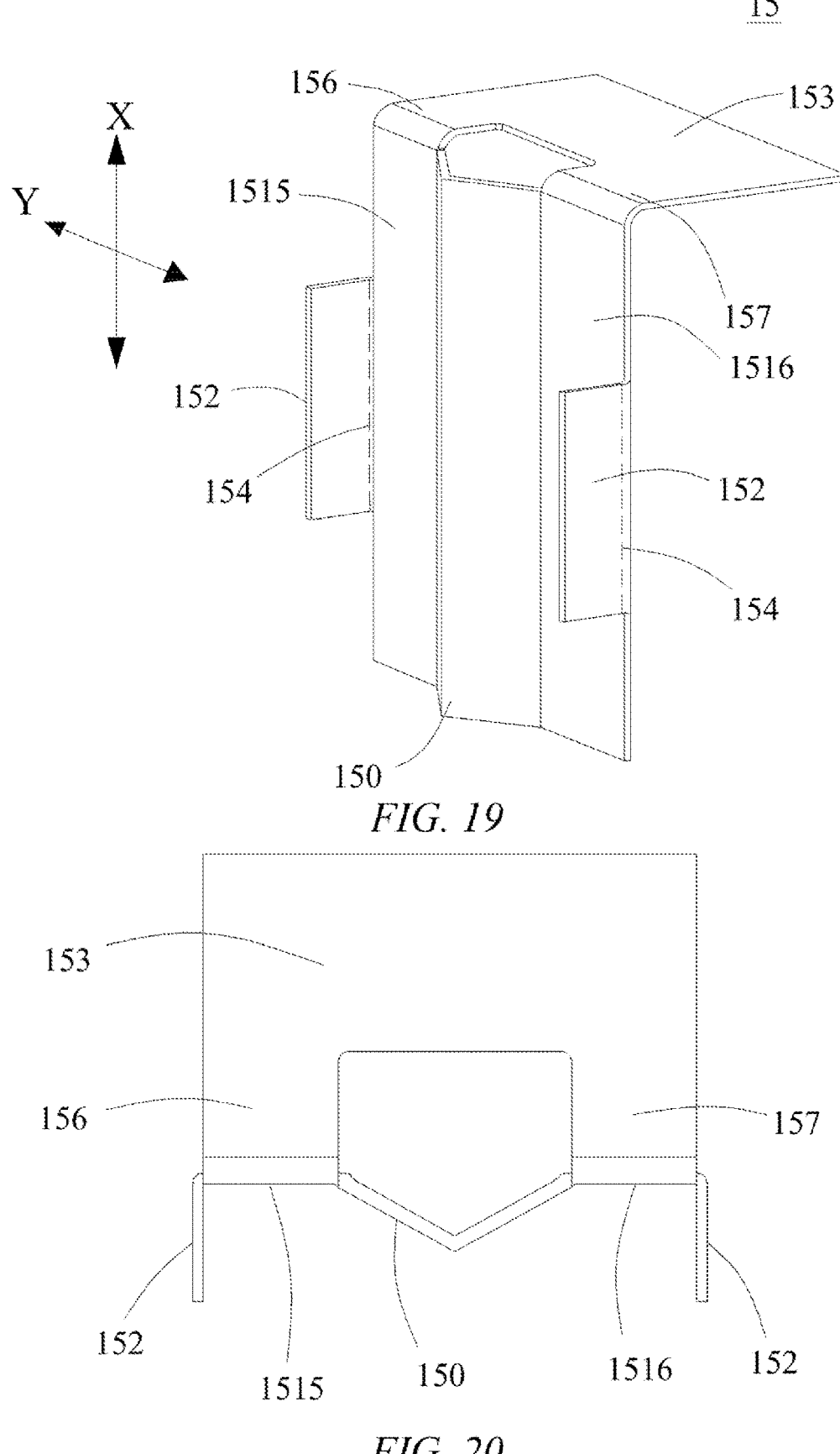
FIG. 19 is a schematic structural diagram of a reinforcement portion of a current collecting member provided in another embodiment of the present application.
FIG. 20 is a top view of FIG. 19.
Figure 21:
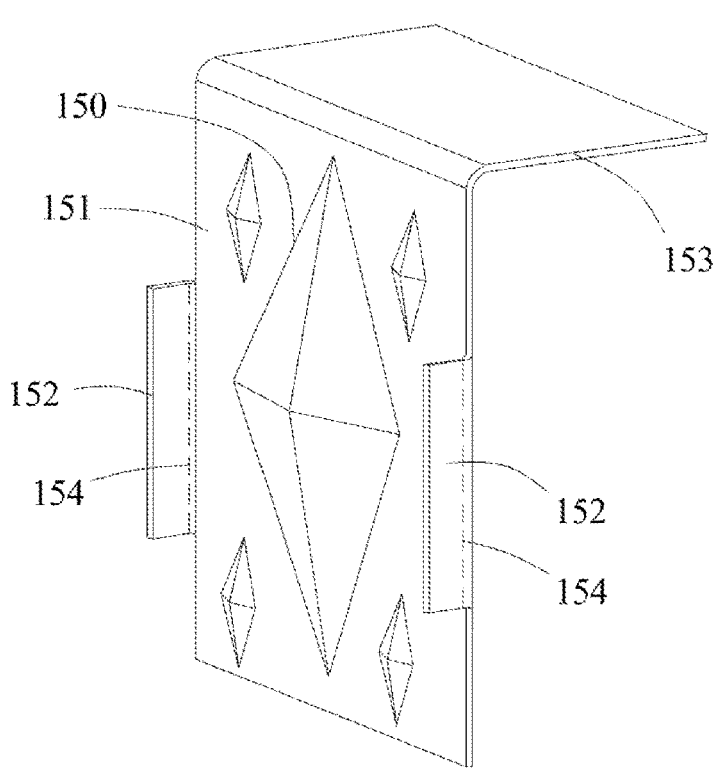
FIG. 21 is a schematic structural diagram of a reinforcement portion of a current collecting member provided in still another embodiment of the present application.

In some embodiments of the present application, it is also possible that the reinforcement portion 150 is in other structural forms. For example, FIG. 19 shows a schematic structural diagram of a reinforcement portion 150 of a current collecting member 15 according to another embodiment of the present application, and FIG. 20 is a top view of FIG. 19. As shown in FIGS. 19 and 20, the reinforcement portion 150 may alternatively be of a V-shaped structure. For another example, FIG. 21 shows a schematic structural diagram of a reinforcement portion 150 of a current collecting member 15 according to still another embodiment of the present application. As shown in FIG. 21, the reinforcement portion 150 may alternatively be of a polygonal structure.

Figure 22:
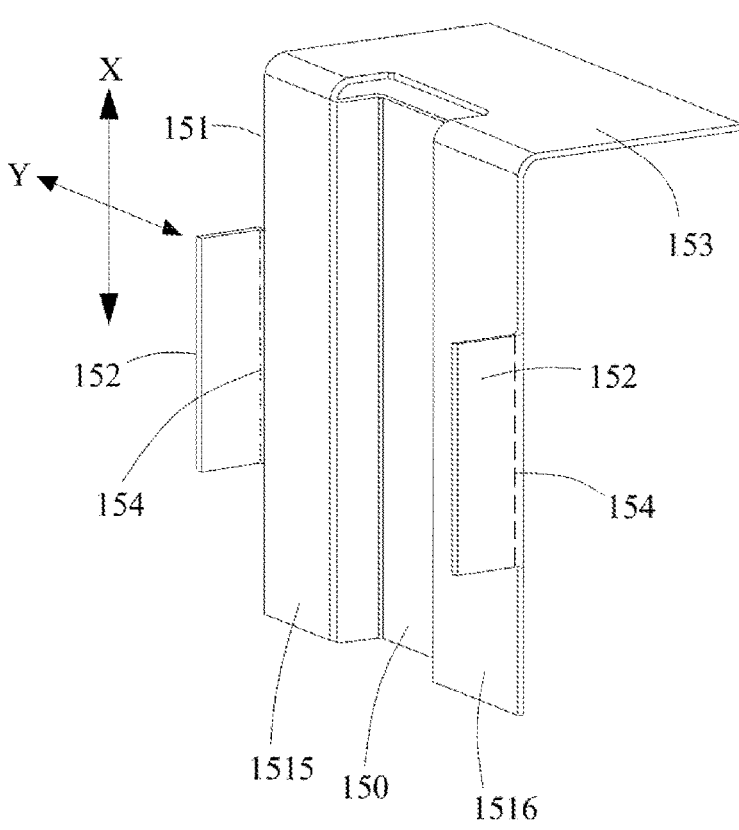
FIG. 22 is a schematic structural diagram of a current collecting member provided in still another embodiment of the present application.

FIG. 22 shows a schematic structural diagram of a current collecting member 15 according to yet another embodiment of the present application. In some embodiments of the present application, as shown in FIG. 22, the reinforcement portion 150 may alternatively protrude toward the main body portion 141 (as shown in FIG. 3) and abut against the main body portion 141. The reinforcement portion 150, which protrudes toward the main body portion 141, may be in contact with the main body portion 141, so as to facilitate the fixing of the main body portion 141 and ensure the assembly stability of the battery cell 1.

It should be noted that, in the case of no conflict, the features in the embodiments of the present application can be combined with each other.

Finally, it should be noted that, the foregoing embodiments are merely used for illustrating rather than limiting the technical solutions of the present application. Although the present application has been illustrated in detail with reference to the foregoing embodiments, it should be understood by those of ordinary skill in the art that they can still modify the technical solutions described in the foregoing embodiments, or make equivalent substitutions to some of the technical features therein, but these modifications or substitutions can be made to the respective technical solutions without departing from the spirit and scope of the technical solutions of the embodiments of the present application.

What is claimed is:

1. A battery cell, comprising:
an electrode assembly, comprising a main body portion and tabs extending from the main body portion; and
current collecting members, each comprising a guide section and a tab connecting section, wherein the tab connecting section is configured to be connected to a respective tab, the guide section is located on a side of the main body portion from which the tab extends and is configured to be connected to the tab connecting section, a fold is provided between the tab connecting section and the guide section, and the guide section comprises a first end and a second end opposite to each other in a first direction, which is an extending direction of the fold; and
wherein the guide section is provided with a reinforcement portion that extends from the first end to the second end, such that when the tab connecting section is bent toward the guide section, the deformation of the guide section is reduced, the reinforcement portion and the guide section are provided separately from each other, the reinforcement portion and the tab connecting section are integrally formed with each other, and the reinforcement portion is connected to the guide section, the guide section comprises a first surface facing the main body portion and a second surface facing away from the main body portion, and the reinforcement portion covers the first surface.

2. The battery cell according to claim 1, wherein the reinforcement portion and the guide section are stacked with each other, with edges of the reinforcement portion being aligned with edges of the guide section.

3. The battery cell according to claim 1, wherein the reinforcement portion is welded to the guide section, and a welded portion is formed after the reinforcement portion is welded to the guide section, the welded portion extending in the first direction.

4. The battery cell according to claim 2, wherein the guide section comprises a first surface facing the main body portion and a second surface facing away from the main body portion, and the reinforcement portion is located at the second surface.

5. The battery cell according to claim 1, wherein an indentation is provided at the fold, and after the tab connecting section is bent along the indentation, part of the tab connecting section is parallel to the guide section.

6. The battery cell according to claim 5, wherein the indentation has a depth of 20-60% of the thickness of the tab connecting section.

7. A battery, comprising the battery cell according to claim 1.

8. A power consuming device, comprising the battery according to claim 7, the battery being configured to provide electric energy.

9. A battery cell, comprising:

an electrode assembly, comprising a main body portion and tabs extending from the main body portion; and current collecting members, each comprising a guide section and a tab connecting section, wherein the tab connecting section is configured to be connected to a respective tab, the guide section is located on a side of the main body portion from which the tab extends and is configured to be connected to the tab connecting section, a fold is provided between the tab connecting section and the guide section, and the guide section comprises a first end and a second end opposite to each other in a first direction, which is an extending direction of the fold, wherein the guide section is provided with a reinforcement portion that extends from the first end to the second end, such that when the tab connecting section is bent toward the guide section, the deformation of the guide section is reduced, the reinforcement portion is integrally formed with the guide section the reinforcement portion and is a protrusion formed on the guide section, wherein the current collecting member further comprises a terminal connecting section, a first overcurrent fuse portion and a second overcurrent fuse portion, the terminal connecting section is configured to be connected to an electrode terminal, a slot is provided between the first overcurrent fuse portion and the second overcurrent fuse portion and at a connection between the terminal connecting section and the guide section, along the second direction, the first overcurrent fuse and the second overcurrent fuse respectively connect the guide section and the terminal connection section, one end of the reinforcement portion extends to the slot.

10. The battery cell according to claim 9, wherein the guide section comprises a first planar portion, a second planar portion, and the reinforcement portion, the first planar portion and the second planar portion are arranged coplanar with each other, the reinforcement portion is arranged between the first planar portion and the second planar portion and is connected to the first planar portion and the second planar portion, the first planar portion, the reinforcement portion and the second planar portion are arranged in sequence in a second direction which is perpendicular to the first direction, the reinforcement portion protrudes from the first planar portion and the second planar portion, one end of the first planar portion is connected to the terminal connecting section via the first overcurrent fuse portion, one end of the second planar portion is connected to the terminal connecting section via the second overcurrent fuse portion.

11. The battery cell according to claim 10, wherein the reinforcement portion comprises a bottom wall, a first side wall and a second side wall, wherein the first side wall and the second side wall are arranged opposite to each other in the second direction, the first side wall is connected to the first planar portion, the second side wall is connected to the second planar portion, and the bottom wall is connected to the first side wall and the second side wall to form a U-shaped structure.

12. The battery cell according to claim 9, wherein the reinforcement portion protrudes toward the main body portion and abuts against and in contact with the main body portion.

13. The battery cell according to claim 9, wherein the tab connecting section is integrally formed with the guide section.

14. The battery cell according to claim 9, wherein the first overcurrent fuse portion is provided with a first notch connected to the slot, and the second overcurrent fuse portion is provided with a second notch connected to the slot.

15. The battery cell according to claim 9, wherein the reinforcement portion has a polygonal structure.

* * * * *